(12) United States Patent
Kiryu

(10) Patent No.: US 7,759,887 B2
(45) Date of Patent: Jul. 20, 2010

(54) MOTOR DRIVING DEVICE, IMAGE FORMING APPARATUS, AND MOTOR DRIVING METHOD

(75) Inventor: Koji Kiryu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 429 days.

(21) Appl. No.: 11/797,826

(22) Filed: May 8, 2007

(65) Prior Publication Data

US 2007/0262738 A1 Nov. 15, 2007

(30) Foreign Application Priority Data

May 10, 2006 (JP) ............... 2006-131776
Mar. 23, 2007 (JP) ............... 2007-076896

(51) Int. Cl.
*H02P 6/10* (2006.01)

(52) U.S. Cl. ............... 318/400.24; 318/400.39; 318/619; 318/632; 318/636

(58) Field of Classification Search ............... 318/268, 318/609, 610, 619, 621, 624, 632, 636, 400.04, 318/400.07, 400.23, 400.24, 400.37, 400.38, 318/400.39
See application file for complete search history.

(56) References Cited

U.S. PATENT DOCUMENTS

| | | | | |
|---|---|---|---|---|
| 3,753,066 A | * | 8/1973 | Sailer | 318/257 |
| 4,139,887 A | * | 2/1979 | Levesque, Jr. | 700/41 |
| 4,527,101 A | * | 7/1985 | Zavis et al. | 318/245 |
| 5,684,650 A | * | 11/1997 | Kadlec et al. | 360/77.06 |
| 2001/0019660 A1 | * | 9/2001 | Ohno et al. | 388/800 |
| 2006/0022628 A1 | * | 2/2006 | Okumatsu et al. | 318/437 |
| 2009/0254300 A1 | * | 10/2009 | Schneider et al. | 702/145 |

FOREIGN PATENT DOCUMENTS

| JP | 2004-157398 A | 6/2004 |
|---|---|---|
| JP | 2005-287187 A | 10/2005 |
| JP | 2006-006066 | 1/2006 |

* cited by examiner

*Primary Examiner*—Bentsu Ro
(74) *Attorney, Agent, or Firm*—Harness, Dickey & Pierce, P.L.C.

(57) ABSTRACT

A motor driving device includes an amplifying unit, a noise removing unit, an analog-to-digital converter, a calculating unit, and a motor driving unit. The amplifying unit amplifies an analog frequency signal corresponding to a rotation speed of a direct-current brushless motor. The noise removing unit removes noise from the analog frequency signal after amplification. The analog-to-digital converter converts the analog frequency signal from which noise is removed to a digital frequency signal. The calculating unit calculates a current control amount with respect to each phase of the direct-current brushless motor based on the digital frequency signal. The motor driving unit drives the direct-current brushless motor at a specified speed based on the current control amount.

18 Claims, 13 Drawing Sheets

MOTOR DRIVING DEVICE, IMAGE FORMING APPARATUS, AND MOTOR DRIVING METHOD

CROSS-REFERENCE TO RELATED APPLICATIONS

The present document incorporates by reference the entire contents of Japanese priority documents, 2006-131776 filed in Japan on May 10, 2006 and 2007-076896 filed in Japan on Mar. 23, 2007.

BACKGROUND OF THE INVENTION

1. Field of the Invention

The present invention relates to a motor driving device, an image forming apparatus, and a motor driving method.

2. Description of the Related Art

Currently, direct current (DC) brushless motors are widely used for operation of equipment that requires high operating precision.

For example, a DC brushless motor is used as a driving source for rotating a photosensitive drum in an electrophotographic image forming apparatus. In such an image forming apparatus, a laser diode (LD) is ON/OFF controlled by image data, the photosensitive drum is exposed to main/sub two-dimensional scanning of generated light beams to write an image thereon. In this writing operation, the rotation of the photosensitive drum is responsible for sub-scanning. If the rotation of the photosensitive drum varies, a positional shift occurs in part of the image on a main scanning line, resulting in reduced image quality. In the case of a color image, write operation is performed for each color, whereby a color shift occurs unless the speed is maintained constant. In view of the foregoing, a DC brushless motor driving device capable of maintaining a specified speed at high precision is required in driving the photosensitive drum.

For example, Japanese Patent Application Laid-Open No. 2006-6066 has proposed a motor driving device that controls the drive of a DC brushless motor. The conventional motor driving device includes a control circuit that performs digital control and a motor drive circuit that drives the motor in response to a command from the control circuit. In the conventional motor driving device, a frequency generator (FG) signal corresponding to the rotation frequency of the motor generated in an FG signal generating unit is amplified in the motor drive circuit (driver), and fed back to the control circuit (control application-specific integrated circuit (ASIC)) after being analog-to-digital (A/D) converted. The control circuit digitally calculates a current control amount with respect to each phase of the DC brushless motor for achieving a target speed based on the FG signal. The current control amount is input to the motor drive circuit as a pulse width modulation (PWM) signal so that the DC brushless motor is driven at the target speed.

In the following, a motor driving device is explained that includes a DC brushless motor as a main motor of an image forming apparatus similarly to the above conventional motor driving device. FIG. 12 is a block diagram of the motor driving device. FIG. 13 is a schematic diagram of signal waveforms generated in circuits.

The motor driving device includes a DC brushless motor as a main motor 1, a control substrate 12 including a motor control circuit, and a drive substrate 13 including a motor drive circuit. The drive substrate 13 is not arranged above the control substrate 12, but is arranged above another substrate or as an independent substrate.

The control substrate 12 includes thereon an ASIC 11, a FG filter 4, and a filter 8 corresponding to the motor control circuit. The ASIC 11 is capable of receiving and outputting digital signals, and performs digital processing.

An FG sensor 14 includes a multipole magnetized rotor magnet of the main motor 1 and a rectangular coil pattern that is arranged circularly to face a magnetized surface of the rotor magnet. When the rotor magnet rotates at the time of driving the main motor 1, a voltage is induced in the coil pattern, and the FG sensor 14 outputs a sine wave signal with a frequency corresponding to the rotation speed of the main motor 1 as indicated by a signal waveform of (a) in FIG. 13. The FG sensor output corresponds to an analog rotation frequency (FG) signal.

The FG sensor output is a weak signal, and thus is amplified by an FG amplifier 2 on the drive substrate 13. The FG sensor output is then converted to a digital signal with a rectangular waveform by a Schmitt comparator 3 of the motor drive circuit, and output to the control substrate 12 as a feed back signal. In FIG. 13, (b) indicates the output of the FG amplifier 2 after amplification, and (c) indicates the rectangular waveform obtained by A/D converting the amplified analog FG signal of (b) with a threshold value in the Schmitt comparator 3.

The FG sensor output input to the control substrate 12 is influenced by external noise on a transmission path from the drive substrate 13 arranged on a separate circuit substrate to the control substrate 12. Accordingly, the signal input to the motor control circuit of the control substrate 12 is superimposed with the external noise of high frequency as indicated by a signal waveform of (d) in FIG. 13. As just described, an FG signal fed back to the control circuit is influenced by external noise because, in the motor driving device shown in FIG. 12, the motor drive circuit and the control circuit are arranged on separate substrates in view of miniaturization and cost reduction, and thus the noise picked up on the transmission path between the circuits is superimposed on the FG signal that is being transmitted through the transmission path.

The FG filter 4 is arranged on the control substrate 12 to filter signals and remove such noise, whereby the FG sensor output from which noise is removed is output to the ASIC 11. In FIG. 13, (e) indicates the digital FG signal output after passing through the FG filter 4. The conventional motor driving device disclosed in Japanese Patent Application Laid-Open No. 2006-6066 does not include such a noise removing unit; however, it is herein assumed that the motor driving device shown in FIG. 12 includes a removing unit such as a noise filter.

In the ASIC 11, a timer 7 generates a frequency signal corresponding to a specified target rotation speed of the main motor 1. A comparing unit 5 compares the frequency signal with the digital FG signal fed back from the drive substrate 13. Specifically, the comparing unit 5 compares rotation frequency (FG) signals from the timer 7 and the FG sensor 14, and generates a correction signal for adjusting the actual rotation speed of the main motor 1 to the target speed. An excitation signal generating unit 6 determines a phase excitation signal with respect to each phase of the main motor 1 based on the correction signal, and outputs the phase excitation signal to the drive substrate 13 as a control signal. The phase excitation signal is, for example, a PWM signal indicating excitation timing.

A motor driver 10 on the drive substrate 13 corresponds to a supply unit that supplies current to excite the main motor 1, and supplies the main motor 1 with current based on the phase excitation signal input from the ASIC 11 on the control substrate 12. Thus, the main motor 1 rotates at the target speed.

Ideally, in the control operation of the motor driving device explained above, the FG sensor output to be fed back is digitally converted so that its rising edge coincides with the time at which the output voltage becomes 0. However, time delay occurs in the rising edge depending on the threshold voltage of the Schmitt comparator 3 indicated by (b) and (c) in FIG. 13, and the minimum value of the high level input voltage of the ASIC 11 indicated by (e) in FIG. 13. If the time delay is large, when there are fluctuations in speed of the main motor 1 due to load fluctuations or external factors, the ASIC 11 requires a longer time to recognize the speed fluctuation. Accordingly, the time taken to correct the actual rotation speed to the target speed is prolonged, and the rotation accuracy degrades.

SUMMARY OF THE INVENTION

It is an object of the present invention to at least partially solve the problems in the conventional technology.

According to an aspect of the present invention, a motor driving device includes an amplifying unit that amplifies an analog frequency signal corresponding to a rotation speed of a direct-current brushless motor, a noise removing unit that removes noise from the analog frequency signal after amplification, an analog-to-digital converter that converts the analog frequency signal from which noise is removed to a digital frequency signal, a calculating unit that calculates a current control amount with respect to each phase of the direct-current brushless motor based on the digital frequency signal, and a motor driving unit that drives the direct-current brushless motor at a specified speed based on the current control amount.

According to another aspect of the present invention, an image forming apparatus includes an image carrier, an image forming unit that forms an image on the image carrier, a direct-current brushless motor that drives the image carrier and the image forming unit, and a motor driving device. The motor driving device that includes an amplifying unit that amplifies an analog frequency signal corresponding to a rotation speed of the direct-current brushless motors a noise removing unit that removes noise from the analog frequency signal after amplification, an analog-to-digital converter that converts the analog frequency signal from which noise is removed to a digital frequency signal, a calculating unit that calculates a current control amount with respect to each phase of the direct-current brushless motor based on the digital frequency signal, and a motor driving unit that drives the direct-current brushless motor at a specified speed based on the current control amount.

According to still another aspect of the present invention, a motor driving method includes amplifying an analog frequency signal corresponding to a rotation speed of a direct-current brushless motor, removing noise from the analog frequency signal after amplification, converting the analog frequency signal from which noise is removed to a digital frequency signal, calculating a current control amount with respect to each phase of the direct-current brushless motor based on the digital frequency signal, and driving the direct-current brushless motor at a specified speed based on the current control amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following, a motor driving device according to the embodiments is applied to, for example, a driving device for a main motor (DC brushless motor) that rotates a photosensitive drum and various operation units for forming an image on the photosensitive drum in an image forming apparatus. The photosensitive drum is driven by feed back control at a target speed so that the peripheral speed thereof at a position exposed to a light beam is maintained constant. The target speed may be changed depending on write density in a sub-scanning direction.

Figure 1:
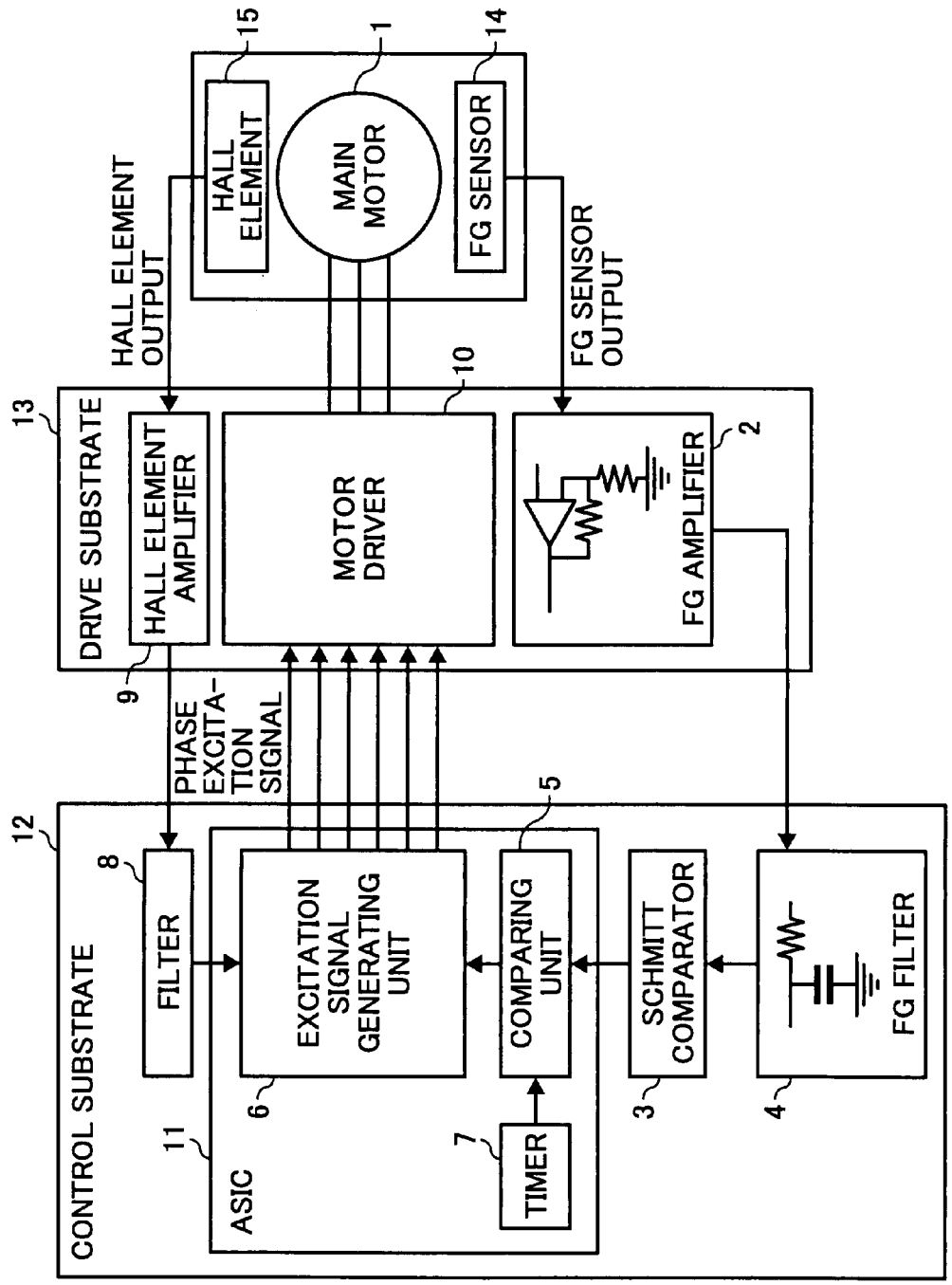
FIG. 1 is a block diagram of a motor driving device according to a first embodiment of the present invention.
Figure 2:
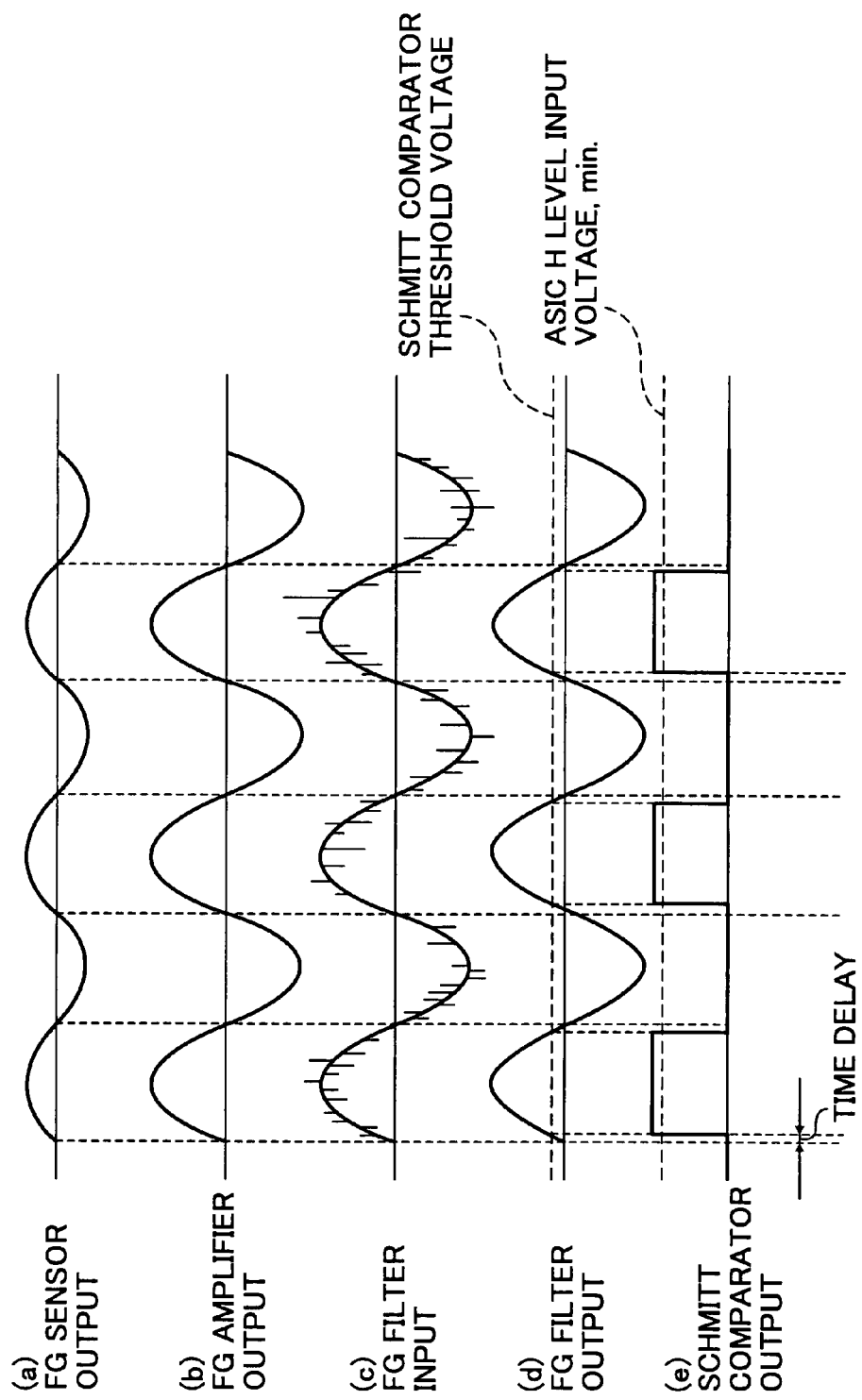
FIG. 2 is a schematic diagram of signal waveforms generated in circuits of the motor driving device.

FIG. 1 is a block diagram of a motor driving device according to a first embodiment of the present invention. FIG. 2 is a schematic diagram of signal waveforms generated in circuits of the motor driving device.

The motor driving device includes a DC brushless motor as the main motor 1, the control substrate 12 including a motor control circuit, and the drive substrate 13 including a motor drive circuit.

The control substrate 12 is a substrate (second substrate) for a main control circuit of the image forming apparatus, and one part thereof constitutes the motor control circuit. The control substrate 12 includes thereon the ASIC 11 serving as a calculating unit, the FG filter 4 functioning as a noise removing unit, the Schmitt comparator 3 functioning as a A/D converter, and the filter 8. The ASIC 11 is capable of receiving and outputting digital signals, and performs digital processing.

The drive substrate 13 is prepared separately from the control substrate 12, and is arranged on another substrate or as an independent substrate. The drive substrate 13 is mounted with the FG amplifier 2 serving as an amplifying unit for FG sensor 14 output, and a Hall element amplifier 9 serving as an amplifier for Hall element 15 output. A Hall element 15 does not directly enter into the present invention, and therefore, it is not described herein.

The FG sensor 14 includes a multipole magnetized rotor magnet of the main motor 1, and a rectangular coil pattern that is arranged circularly to face a magnetized surface of the rotor magnet. When the rotor magnet rotates at the time of driving the main motor 1, a voltage is induced in the coil pattern, and the FG sensor 14 outputs a sine wave signal with a frequency corresponding to the rotation speed of the main motor 1 as indicated by a signal waveform of (a) in FIG. 2. The FG sensor output corresponds to an analog rotation frequency (FG) signal.

Figure 12:
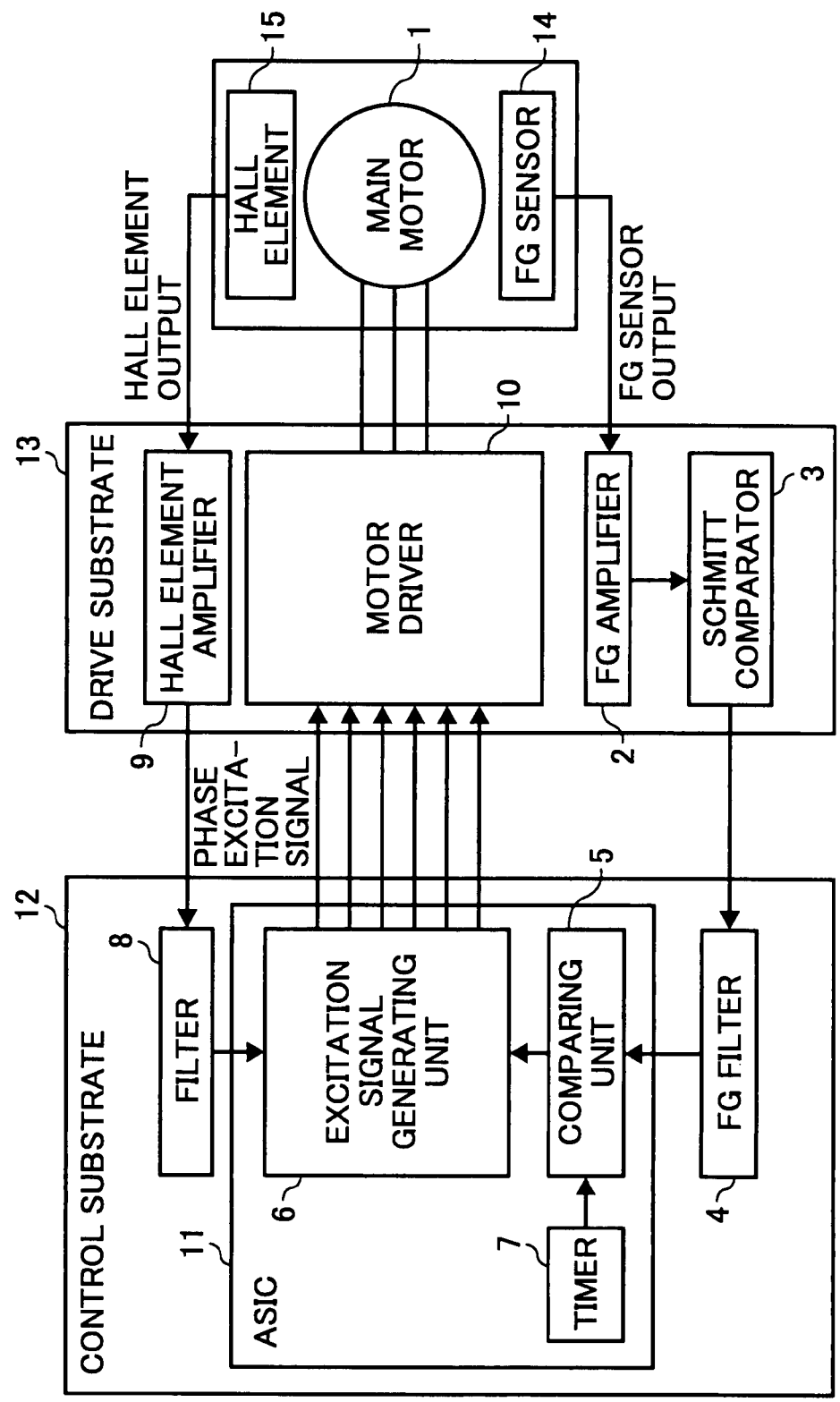
FIG. 12 is a block diagram of a conventional motor driving device.

The FG sensor output is a weak signal, and thus is amplified by the FG amplifier 2 on the drive substrate 13. The FG sensor output being an analog signal is output to the control substrate 12 as a feed back signal. In FIG. 2, (b) indicates the output of the FG amplifier 2 after amplification. In the first embodiment, the analog signal after the amplification indicated by (b) of FIG. 2 is fed back to the control substrate 12. In the conventional circuit shown in FIG. 12, the Schmitt comparator 3 serving as an A/D converting unit is arranged in the motor drive circuit of the drive substrate 13, and an A/D converted rectangular digital signal is output to the control substrate 12.

The FG sensor signal fed back as an analog signal to the control substrate 12 is influenced by external noise on a transmission path from the drive substrate 13 arranged on a separate circuit substrate to the control substrate 12. Accordingly, the signal input to the motor control circuit of the control substrate 12 is superimposed with the external noise of high frequency as indicated by a signal waveform of (c) in FIG. 2.

Figure 13:
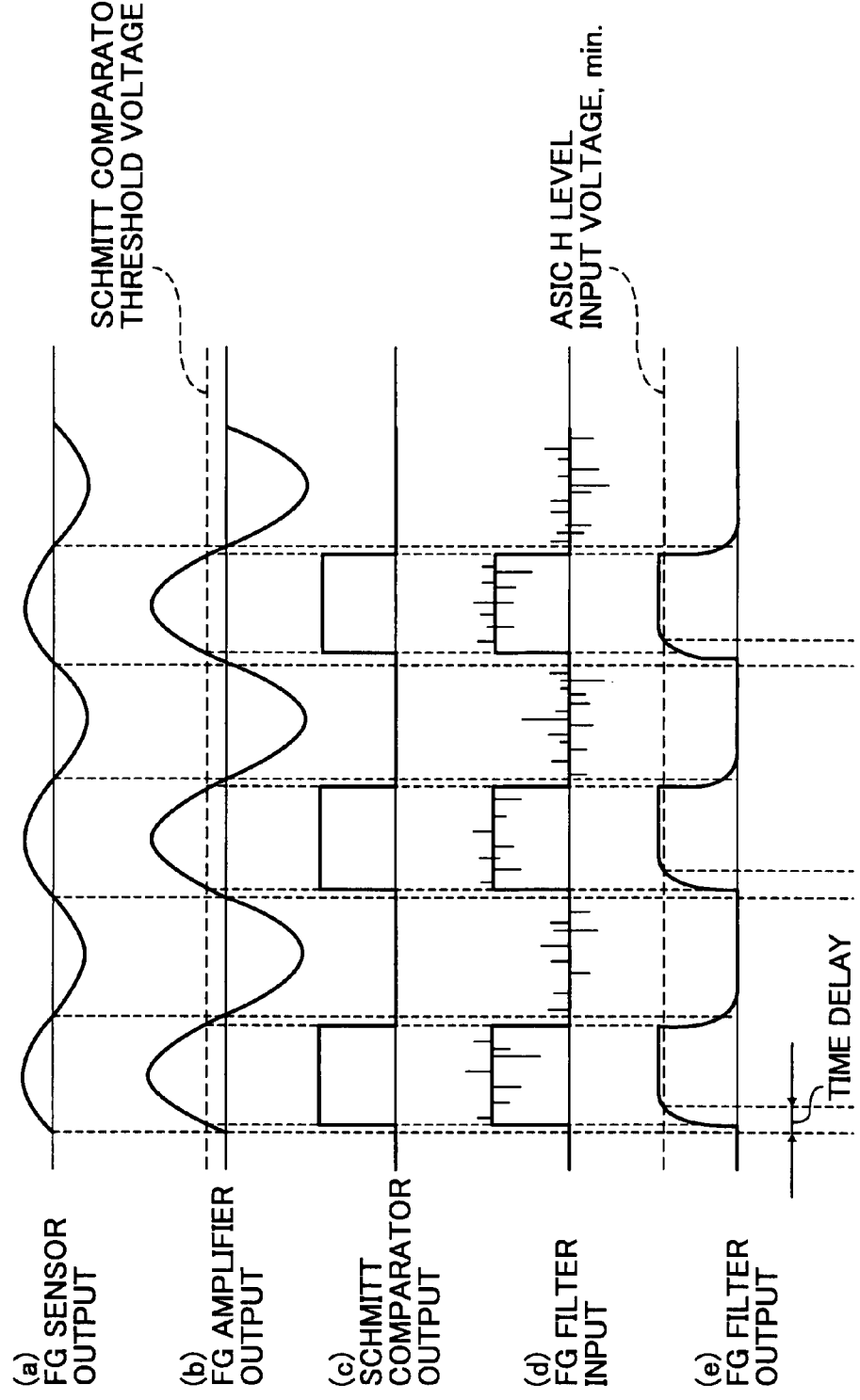
FIG. 13 is a schematic diagram of signal waveforms generated in circuits of the conventional motor driving device.

The FG filter 4 is arranged on the control substrate 12 to remove the noise when the input analog FG signal passes through the FG filter 4. In FIG. 2, (d) indicates the analog FG signal output after passing through the FG filter 4. The FG signal from which the noise is removed is output to the Schmitt comparator 3. In the conventional circuit shown in FIG. 12, the noise is removed after the analog signal output from the FG sensor 14 is converted to a digital signal, which causes waveform rounding. Consequently, time delay occurs depending on the minimum value of the high level input voltage of the ASIC 11 (see (e) in FIG. 13). On the other hand, in the first embodiment, waveform rounding does not occur because the noise is removed from the analog signal before A/D conversion.

In the first embodiment, a low pass filter is cited as the FG filter 4 by way of example; however, other filters than the low pass filter, such as a band pass filter, and a digital filter including a finite impulse response (FIR) filter and an infinite impulse response (IIR) filter, can be used.

The Schmitt comparator 3 receives the analog FG signal from which the noise is removed, and converts the analog FG signal to a digital signal with a predetermined threshold value. The Schmitt comparator 3 outputs a rectangular wave signal obtained by the A/D conversion to the ASIC 11 capable of processing the digital signal. In FIG. 2, (e) indicates the rectangular wave output obtained by the A/D conversion on the analog FG signal indicated by (d) in FIG. 2 with the threshold value.

In the ASIC 11, the timer 7 generates a frequency signal corresponding to a specified target rotation speed of the main motor 1. The comparing unit 5 compares the frequency signal with the digital FG signal fed back from the drive substrate 13. Specifically, the comparing unit 5 compares rotation frequency (FG) signals from the timer 7 and the FG sensor, and generates a correction signal for adjusting the actual rotation speed of the main motor 1 to the target speed. The excitation signal generating unit 6 determines a phase excitation signal with respect to each phase of the main motor 1 based on the correction signal, and outputs the phase excitation signal to the drive substrate 13 as a control signal. The phase excitation signal is, for example, a PWM signal indicating excitation timing.

The motor driver 10 on the drive substrate 13 corresponds to a motor driving unit that supplies current to excite and drive the main motor 1, and supplies the main motor 1 with current based on the excitation signal input from the ASIC 11 on the control substrate 12. Thus, the main motor 1 rotates at the target speed.

As described above, according to the first embodiment, waveform rounding does not occur because noise is removed from an analog signal before A/D conversion, and only a time delay caused by the threshold voltage of the Schmitt comparator 3 is produced. Thus, the time taken to recognize fluctuations in speed of the main motor 1 is reduced, and the rotation accuracy is enhanced compared to the conventional circuit described in connection with FIG. 12.

Specifically, an analog frequency signal corresponding to the rotation speed of the DC brushless motor (main motor 1) is amplified. Noise is removed from the analog frequency signal after the amplification, and then the analog frequency signal is converted to a digital frequency signal. Thus, waveform rounding does not occur that occurs when noise is removed from a digitally converted rectangular wave signal as in the conventional technology, and only a time delay caused by the threshold voltage of A/D conversion in the A/D converter is produced. Therefore, the time taken to recognize fluctuations in speed of the DC brushless motor is reduced, and the rotational accuracy of the DC brushless motor is enhanced compared to the conventional technology.

Besides, the calculating unit (ASIC 11) and the motor driving unit (motor driver 10) are mounted on separate substrates. The noise removing unit (FG filter 4) is mounted on the second substrate (control substrate 12) with the calculating unit, and the amplifying unit (FG amplifier 2) is mounted on the first substrate (drive substrate 13) with the motor driving unit. The analog frequency signal is output from the amplifying unit to the noise removing unit. Therefore, it is possible to achieve miniaturization and cost reduction of the motor driving device as well as enhancing the rotational accuracy of the DC brushless motor.

Figure 3:
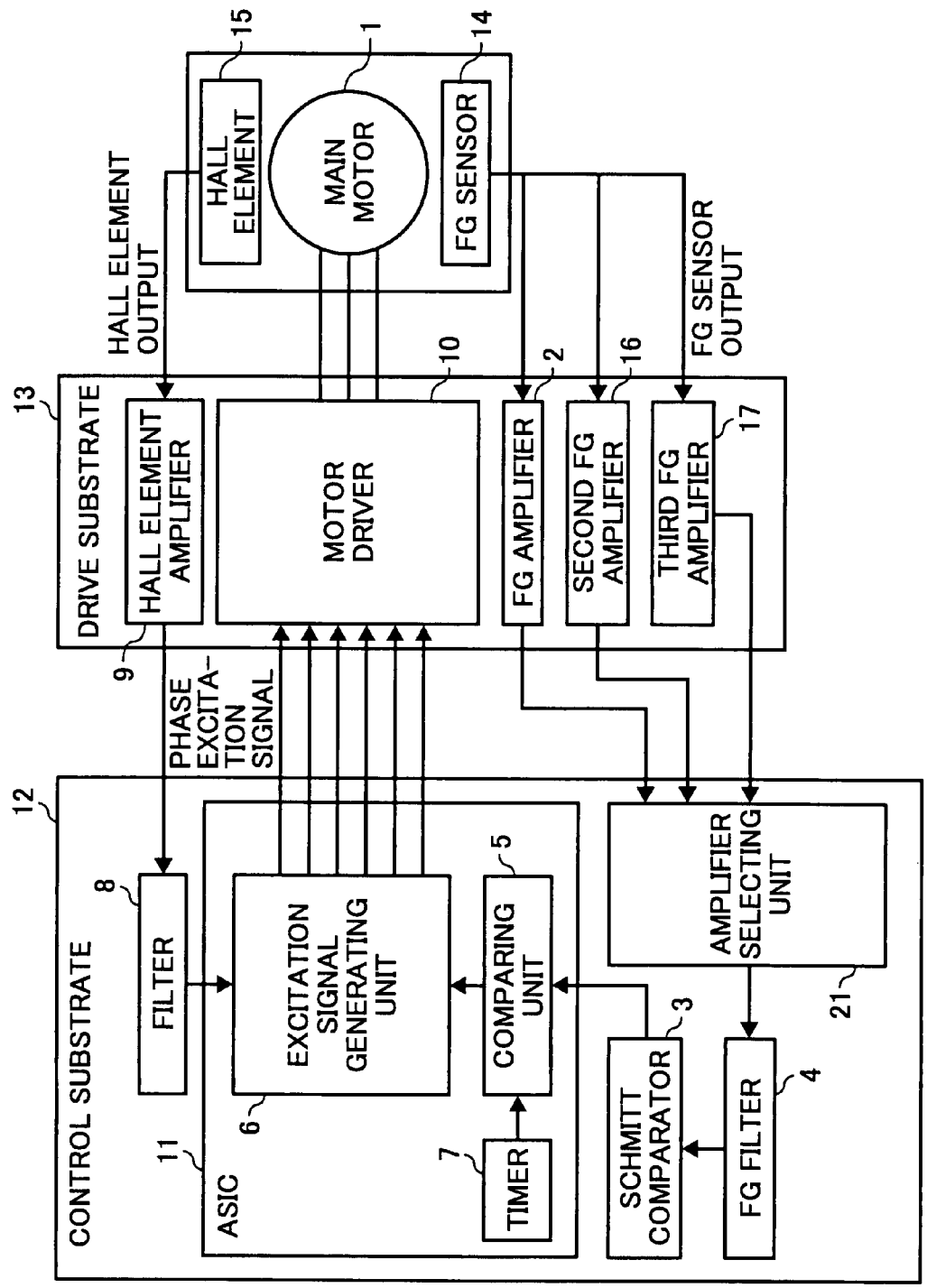
FIG. 3 is a block diagram of a motor driving device according to a second embodiment of the present invention.

FIG. 3 is a block diagram of a motor driving device according to a second embodiment of the present invention. The motor driving device shown in FIG. 3 is basically similar to the motor driving device (FIG. 1) explained in the first embodiment except that it selectively uses a plurality of amplifiers with different gains. The same reference characters are utilized in designating corresponding components, and the same explanations are not repeated.

The motor driving device of the second embodiment includes, in addition to the FG amplifier 2, a second FG amplifier 16, and a third FG amplifier 17. The FG amplifier 2, the second FG amplifier 16, and the third FG amplifier 17 have different gains, and are selectively used for the output signal of the FG sensor 14. The motor driving device further includes an amplifier selecting unit 21 that selects one of the FG amplifiers 2, 16, and 17 for use. The amplifier selecting unit 21 is arranged on the control substrate 12. The FG amplifiers 2, 16, 17 and the amplifier selecting unit 21 constitute a gain varying unit.

Figure 4A:
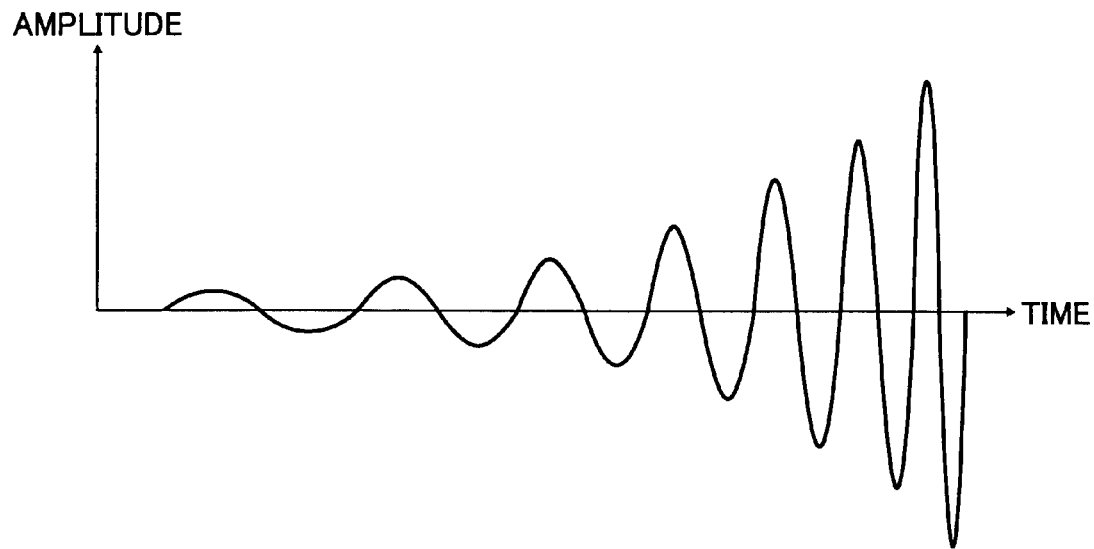
FIG. 4A is a waveform chart for explaining output characteristics of an FG sensor upon motor activation.

The FG sensor 14 includes a multipole magnetized rotor magnet of the main motor 1, and a rectangular coil pattern that is arranged circularly to face a magnetized surface of the rotor magnet. The output obtained by such configuration has the characteristic as shown in FIG. 4A. In FIG. 4A, the vertical axis represents amplitude of sensor output, the horizontal axis represents the time, and the characteristic line indicates change from low speed to high speed. As shown in FIG. 4A, amplitude is small and frequency is small when the main motor 1 is rotating at low speed, and both amplitude and frequency increase as the speed of the main motor 1 increases. If a single FG amplifier that receives sensor output is used, the gain is unchanged, and the output after amplified by the FG amplifier has the characteristic as shown in FIG. 4A.

Assuming that component of external noise that is superimposed on an FG signal on the transmission path from the drive substrate 13 to the control substrate 12 is constant, the signal-to-noise (S/N) ratio lowers as the speed of the main motor 1 decreases, and the influence of the external noise becomes large.

In the second embodiment, a plurality of FG amplifiers, the FG amplifier 2, the second FG amplifier 16, and the third FG amplifier 17, with different gains is arranged on the drive substrate 13, and one FG amplifier is selected by the amplifier selecting unit 21 arranged on the control substrate 12. Specifically, the amplifier selecting unit 21 selects the output of an FG amplifier having a high gain while the main motor 1 is rotating at low speed, and selects an FG amplifier having a lower gain as the speed of the main motor 1 increases, so that difference in influence of the external noise depending on the speed of the main motor 1 is eliminated, and a stable FG amplifier output can be obtained even when the main motor 1 is rotating at low speed.

Figure 4B:
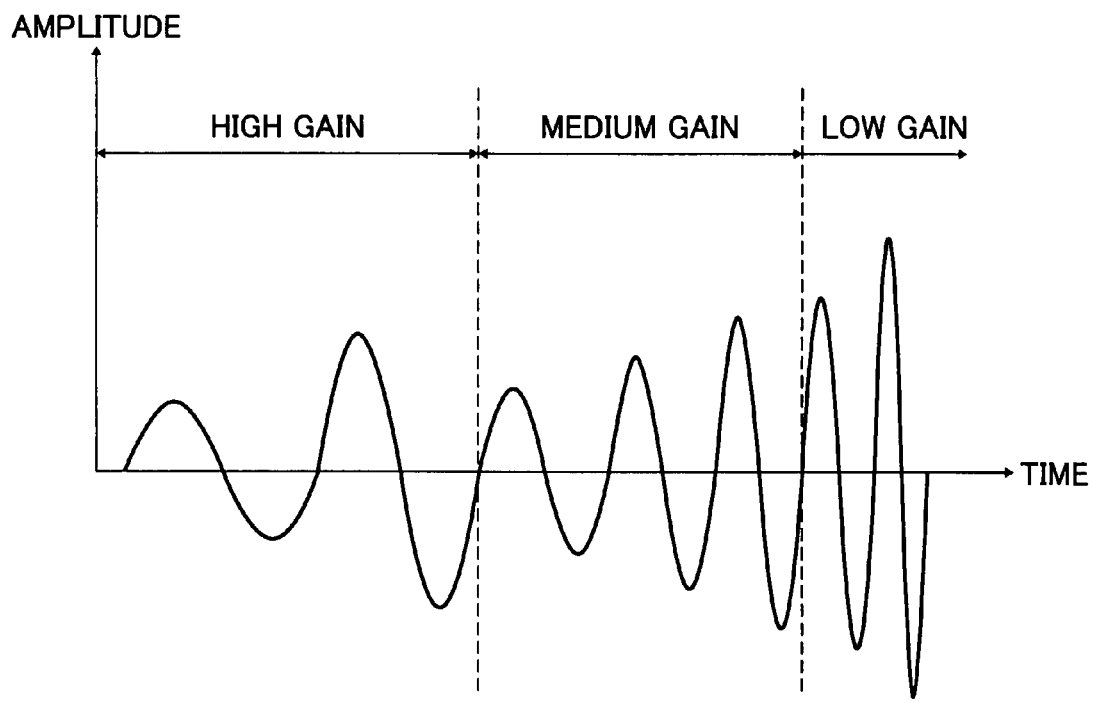
FIG. 4B is a waveform chart for explaining sensor output after amplification when one of FG amplifiers having different gains is selected.

In FIG. 4B, the vertical axis represents amplitude of the sensor output and the horizontal axis represents the time. FIG. 4B depicts the result obtained by an FG amplifier selected according to a change in FG sensor output before amplification as shown in FIG. 4A. Comparing FIGS. 4A and 4B, it can be seen that the amplitude of the output that varies according to a change from low speed to high speed approaches the same level in FIG. 4B.

In this manner, one amplifying unit (FG amplifier) is selected according to the rotation speed of the DC brushless motor (main motor 1) from the amplifying units with different gains. Specifically, an amplifying unit with high gain is selected when the DC brushless motor is rotating at low speed, and an amplifying unit with low gain is selected as the rotation speed of the DC brushless motor increases. Thus, the difference in influence of external noise caused by the difference in the rotation speed of the DC brushless motor is eliminated, and a stable output from the amplifying unit can be obtained even when the DC brushless motor is rotating at low speed.

How the amplifier selecting unit 21 selects one of the FG amplifiers 2, 16, and 17 each having a different gain is explained.

The FG sensor 14 is characterized in that the amplitude and the frequency of its output depend on the speed of the main motor 1. Accordingly, if the amplitude or the frequency of the FG sensor output is detected, an FG amplifier to be used for adjusting the output level that fluctuates in response to the motor speed can be selected from the FG amplifiers 2, 16, and 17 based on the detection result.

Besides, provided that a relationship between rotation speed and elapsed time from activation of the main motor 1 complies with a predetermined operation characteristic, appropriate switch timing can be estimated by the elapsed time from the activation of the main motor 1. Accordingly, an FG amplifier to be used for adjusting the output level that fluctuates in response to the motor speed can be selected from the FG amplifiers 2, 16, and 17 by detecting the elapsed time.

In the second embodiment, selection of an FG amplifier based on FG output amplitude, FG output frequency, and the elapsed time is explained.

First, selection of an FG amplifier based on FG output amplitude is explained, in which the amplitude of FG sensor output is detected and an FG amplifier is selected based on the detection result. The amplifier selecting unit 21 has a function of detecting the amplitude of an FG signal output from the FG sensor 14, and, by comparing the amplitude with a reference value, determining appropriateness of an FG amplifier currently being used.

The amplifier selecting unit 21 includes, as with the Schmitt comparator 3 that processes the output of the FG filter 4, a circuit (not shown) that realizes the above function by processing the amplitude of a signal output from the FG filter 4 with a predetermined reference value as a threshold and determining the appropriateness.

In the following example, the speed is gradually increased from low speed after the main motor 1 is activated, and the operation of selecting an FG amplifier is repeated until the photosensitive drum stably rotates with a constant peripheral speed. The FG amplifier 2 having the highest gain is selected first because the amplitude of FG signal output is small at the time of start-up, and the second FG amplifier 16 and the third FG amplifier 17 having lower gains are selected as the speed gradually increases. With this, an FG amplifier can be selected that achieves stable FG amplifier output even when the main motor 1 is rotating at low speed at initial operation.

Figure 5:
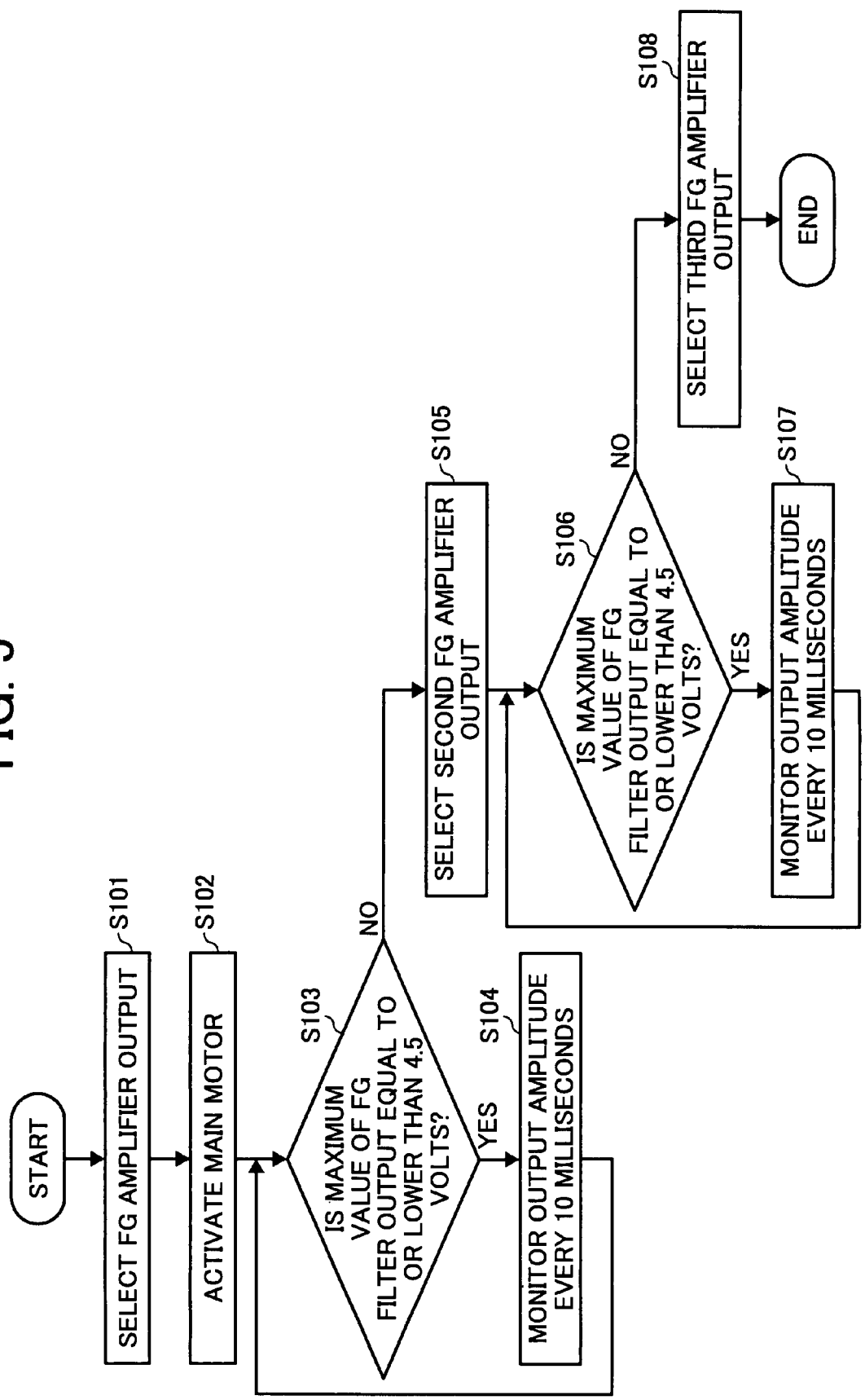
FIG. 5 is a flowchart of a process of selecting an FG amplifier based on FG output amplitude.

FIG. 5 is a flowchart of a process of selecting an FG amplifier based on FG output amplitude performed by the amplifier selecting unit 21.

As shown in FIG. 5, the FG amplifier 2 with the highest gain is selected according to the setting of the initial condition before activation of the main motor 1, and the output of the FG amplifier 2 is input to the FG filter 4 (step S101).

Thereafter, the main motor 1 is activated (step S102), and the amplitude of the output of the FG filter 4 is periodically monitored (steps S103 and S104). In FIG. 5, the wait time is set to 10 milliseconds, and thus, the amplitude of the FG filter output is monitored every 10 milliseconds. The monitoring interval, however, is not limited to 10 milliseconds, and can be arbitrarily set.

The amplitude of the output detected by monitoring is compared with a predetermined reference value to determine the appropriateness of the FG amplifier 2 currently being selected. In the example shown in FIG. 5, the reference value is set to 4.5 volts, and the monitoring is continued without changing the FG amplifier 2 while the FG filter output does not exceed the reference value (YES at step S103).

If the FG filter output exceeds the reference value (NO at step S103), the use of the FG amplifier 2 is determined to be inappropriate. Accordingly, the second FG amplifier 16 having lower gain is selected, and the FG amplifiers are switched from one to another (step S105).

With the second FG amplifier 16, the amplification gain decreases, and thus, the amplitude of the FG filter output immediately after the switching decreases. Thereafter, the amplitude of the FG filter output is continuously monitored (steps S106 and S107). In this example, the condition is not changed even if the FG amplifiers are switched from one to another because the monitoring wait time is set to 10 milliseconds, and the reference value for determining the appropriateness of the FG amplifier is set to 4.5 volts.

The output amplitude of the FG filter 4 is monitored, and the monitoring is continued without changing the FG amplifier while the FG filter output does not exceed the reference value (YES at step S106).

If the FG filter output exceeds the reference value (NO at step S106), the use of the second FG amplifier 16 is determined to be inappropriate. Accordingly, the third FG amplifier 17 having a lower gain is selected, and the FG amplifiers are switched from one to another (step S108).

A stable FG amplifier output can be obtained and output to the FG filter 4 by switching the FG amplifiers through the selecting operation as above.

As just described, an amplifying unit (FG amplifier) having the highest gain is selected upon motor activation when the amplitude of an analog frequency signal is small. An amplifying unit having lower gain is selected as the speed gradually increases to change the gain according to the amplitude of the analog frequency signal that depends on the rotation speed of the DC brushless motor (main motor 1). Thus, stable output can be obtained from the amplifying unit even when the DC brushless motor is rotating at low speed.

Selection of an FG amplifier based on FG output frequency is explained, in which the frequency of FG sensor output is detected and an FG amplifier is selected based on the detection result. The amplifier selecting unit 21 has a function of detecting the frequency of an FG signal output from the FG sensor 14, and, by comparing the frequency with a reference value, determining appropriateness of an FG amplifier currently being used.

The amplifier selecting unit 21 includes a circuit (not shown) that realizes the above function by processing the frequency of a signal output from the FG filter 4 with a predetermined reference value as a threshold and determining the appropriateness.

In the following example, the speed is gradually increased from low speed after the main motor 1 is activated, and the operation of selecting an FG amplifier is repeated until the photosensitive drum stably rotates with a constant peripheral speed. The FG amplifier 2 having the highest gain is selected first because the frequency of FG signal output is low, i.e., the amplitude is small at the time of start-up (see description of FIG. 4A), and the second FG amplifier 16 and the third FG amplifier 17 having lower gains are selected as the speed gradually increases, and the frequency increases, i.e., the amplitude increases. With this, an FG amplifier can be selected that achieves stable FG amplifier output even when the main motor 1 is rotating at low speed at initial operation.

Figure 6:
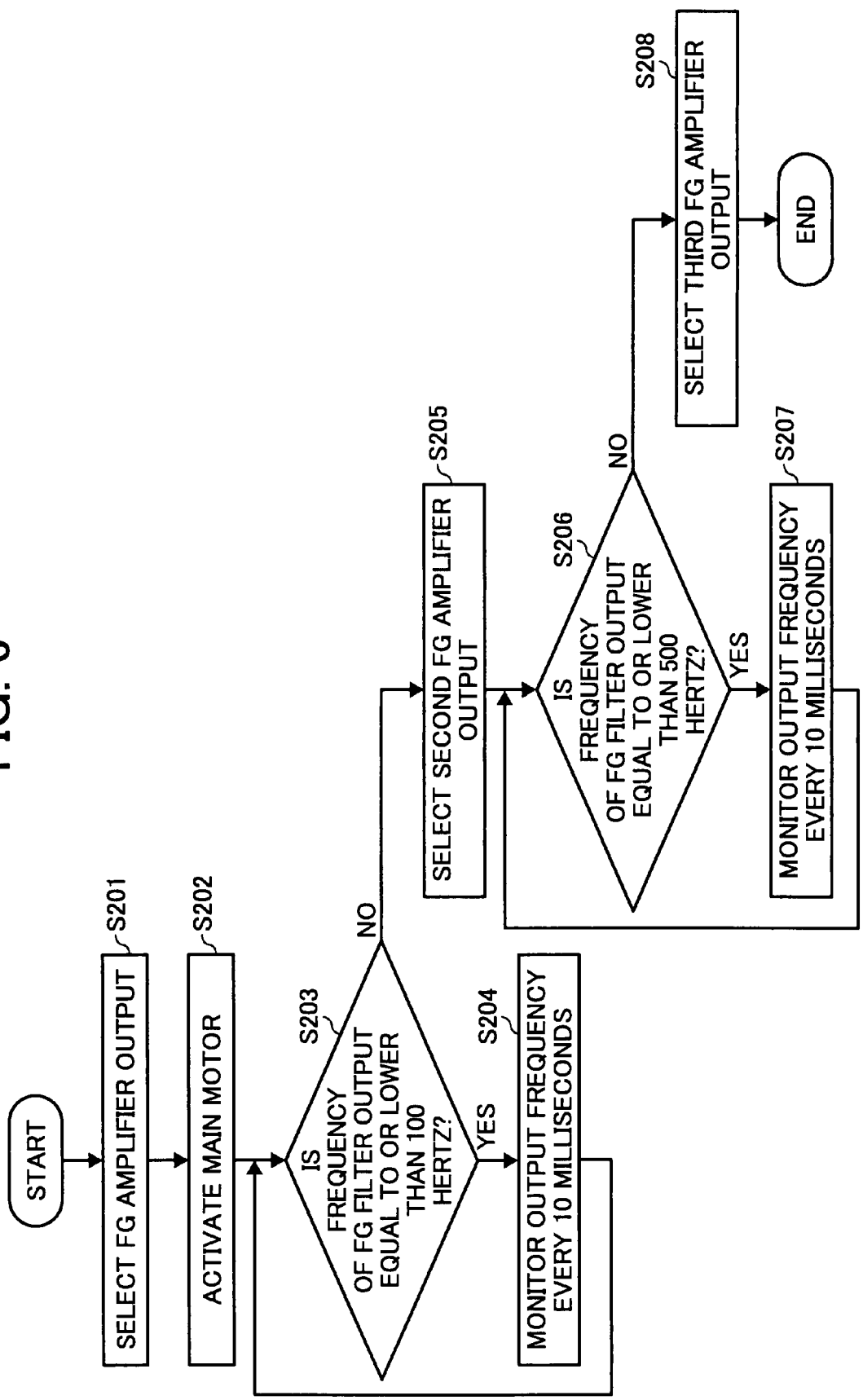
FIG. 6 is a flowchart of a process of selecting an FG amplifier based on FG output frequency.

FIG. 6 is a flowchart of a process of selecting an FG amplifier based on FG output frequency performed by the amplifier selecting unit 21.

As shown in FIG. 6, the FG amplifier 2 with the highest gain is selected according to the setting of the initial condition before activation of the main motor 1, and the output of the FG amplifier 2 is input to the FG filter 4 (step S201).

Thereafter, the main motor 1 is activated (step S202), and the frequency of the output of the FG filter 4 is periodically monitored (steps S203 and S204). In FIG. 6, the wait time is set to 10 milliseconds, and thus, the frequency of the FG filter output is monitored every 10 milliseconds. The monitoring interval, however, is not limited to 10 milliseconds, and can be arbitrarily set.

The frequency of the output detected by monitoring is compared with a predetermined reference value to determine the appropriateness of the FG amplifier 2 currently being selected. In the example shown in FIG. 6, the reference value is set to 100 hertz, and the monitoring is continued without changing the FG amplifier while the FG filter output does not exceed the reference value (YES at step S203).

If the FG filter output exceeds the reference value (NO at step S203), the use of the FG amplifier 2 is determined to be inappropriate. Accordingly, the second FG amplifier 16 having lower gain is selected, and the FG amplifiers are switched from one to another (step S205).

With the second FG amplifier 16, the amplification gain decreases, and thus, the amplitude of the FG filter output immediately after the switching decreases. Thereafter, the frequency of the FG filter output is continuously monitored (steps S206 and S207). In the case of monitoring output frequency, the output frequency continues to increase even if the FG amplifiers are switched and the output amplitude decreases. Therefore, the output frequency corresponding to the output amplitude is set as another reference value for determining the appropriateness so that the output amplitude does not increase again due to increase in speed. In this example, the reference value is set to 500 hertz.

While the FG filter output does not exceed the newly set reference value (500 hertz), the monitoring is continued without changing the FG amplifier (YES at step S206).

If the FG filter output exceeds the reference value (NO at step S206), the use of the second FG amplifier 16 is determined to be inappropriate. Accordingly, the third FG amplifier 17 having lower gain is selected, and the FG amplifiers are switched from one to another (step S208).

A stable FG amplifier output can be obtained and output to the FG filter 4 by switching the FG amplifiers through the selecting operation as above.

As just described, an amplifying unit (FG amplifier) having the highest gain is selected upon motor activation when the frequency of an analog frequency signal is small. An amplifying unit having lower gain is selected as the speed gradually increases and the frequency increases, i.e., the amplitude increases to change the gain according to the frequency of the analog frequency signal that depends on the rotation speed of the DC brushless motor (main motor 1). Thus, stable output can be obtained from the amplifying unit even when the DC brushless motor is rotating at low speed.

Selection of an FG amplifier based on the elapsed time from motor activation is explained, in which the elapsed time from the motor activation is detected and an FG amplifier is selected based on the detection result. The amplifier selecting unit 21 has a function of measuring the time elapsed from motor activation with the timer 7, and, by comparing the measured elapsed time with a reference value, determining appropriateness of an FG amplifier currently being used.

The amplifier selecting unit 21 includes a circuit (not shown) that realizes the above function by initializing the timer 7 simultaneously with activation of the main motor 1, obtaining the elapsed time from the time of activation, and determining whether the obtained elapsed time reaches a predetermined reference time.

In the following example, the speed is gradually increased from low speed after the main motor 1 is activated, and the operation of selecting an FG amplifier is repeated until the photosensitive drum stably rotates with a constant peripheral speed. The FG amplifier 2 having the highest gain is selected first because the amplitude of FG signal output is small at the time of start-up, and the second FG amplifier 16 and the third FG amplifier 17 having lower gains are selected as the speed gradually increases with time. With this, an FG amplifier can be selected that achieves stable FG amplifier output even when the main motor 1 is rotating at low speed at initial operation.

Figure 7:
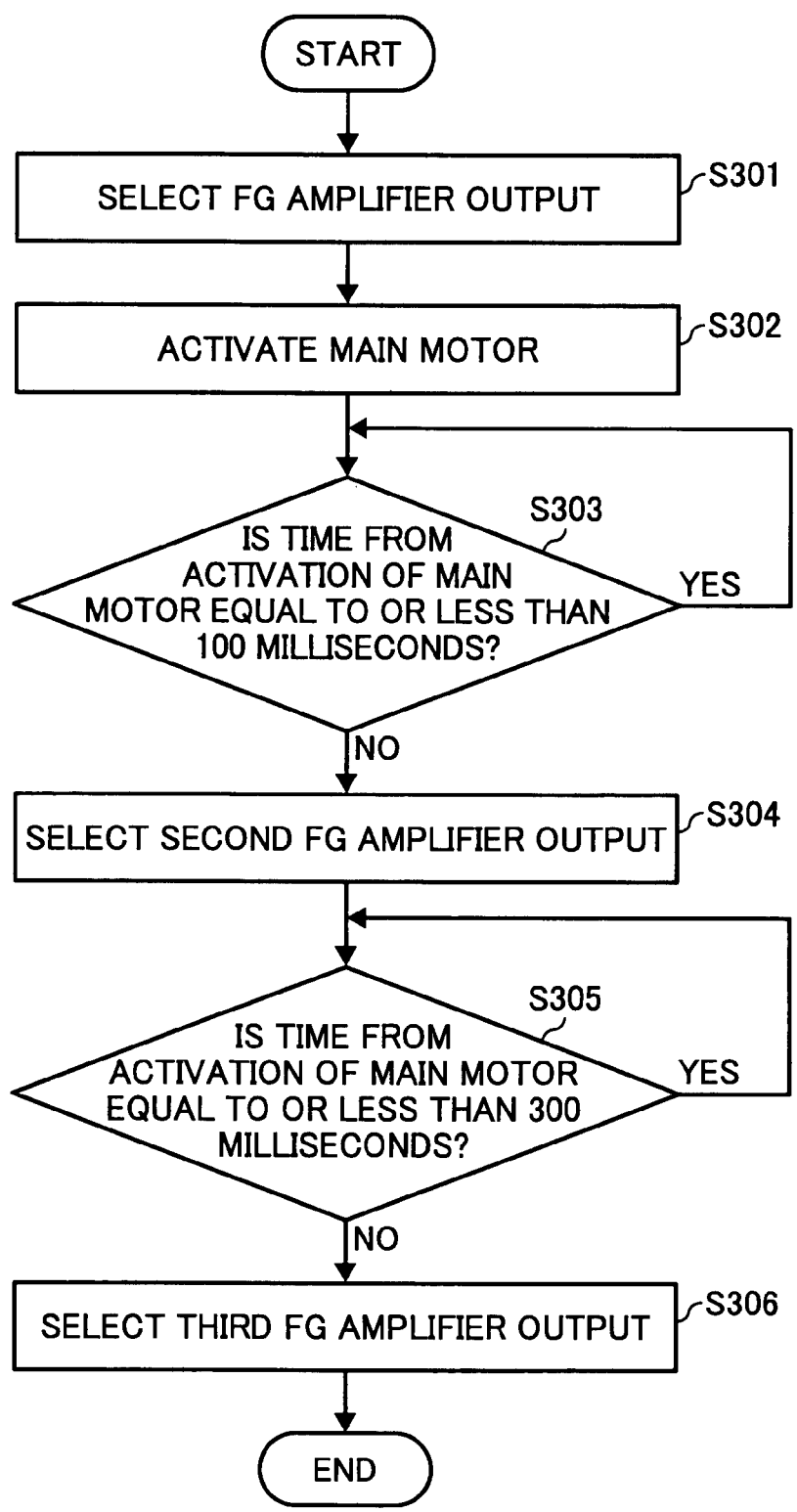
FIG. 7 is a flowchart of a process of selecting an FG amplifier based on the elapsed time from motor activation.

FIG. 7 is a flowchart of a process of selecting an FG amplifier based on the elapsed time from motor activation performed by the amplifier selecting unit 21.

As shown in FIG. 7, the FG amplifier 2 with the highest gain is selected according to the setting of the initial condition before activation of the main motor 1, and the output of the FG amplifier 2 is input to the FG filter 4 (step S301).

Thereafter, the main motor 1 is activated (step S302). At this point, the timer 7 is initialized to measure the elapsed time from the activation of the main motor 1, and it is periodically checked whether the elapsed time measured by the timer 7 has reached a preset reference time (step S303).

In FIG. 7, the reference time set for determining the appropriateness of the FG amplifier 2 is 100 milliseconds, and it is checked whether the elapsed time has reached 100 milliseconds. The reference time is not limited to 100 milliseconds, and can be arbitrarily set in view of the "elapsed time-rotation speed" operation characteristic and the gain of the FG amplifier.

The operation of checking the elapsed time from the motor activation with the reference time is continued without changing the FG amplifier while the elapsed time does not exceed 100 milliseconds set as the reference time (YES at step S303).

If the elapsed time exceeds the reference time (NO at step S303), the use of the FG amplifier 2 is determined to be inappropriate. Accordingly, the second FG amplifier 16 having lower gain is selected, and the FG amplifiers are switched from one to another (step S304).

With the second FG amplifier 16, the amplification gain decreases, and thus, the amplitude of the FG filter output immediately after the switching once falls, but thereafter, continues to rise again.

Subsequently, the elapsed time from motor activation is checked with another reference time (step 5305) set for determining the appropriateness of the newly selected second FG amplifier 16. The reference time is set to 300 milliseconds in the example.

While the elapsed time does not exceed the newly set reference time (300 milliseconds), the check is continued without changing the FG amplifier (YES at step S305).

If the elapsed time exceeds the reference time (NO at step S305), the use of the second FG amplifier 16 is determined to be inappropriate. Accordingly, the third FG amplifier 17 having lower gain is selected, and the FG amplifiers are switched from one to another (step S306).

A stable FG amplifier output can be obtained and output to the FG filter 4 by switching the FG amplifiers through the selecting operation as above.

As just described, an amplifying unit (FG amplifier) having the highest gain is selected upon motor activation when the amplitude of an analog frequency signal is small. An amplifying unit having lower gain is selected as the speed gradually increases with time to change the gain according to the elapsed time from the activation of the DC brushless motor (main motor 1) that corresponds to the rotation speed of the DC brushless motor. Thus, stable output can be obtained from the amplifying unit even when the DC brushless motor is rotating at low speed.

According to the second embodiment, the difference in influence of external noise caused by the difference in rotation speed of the DC brushless motor can be eliminated by selectively using a plurality of amplifying units with different gains according to the rotation speed of the DC brushless motor. Thus, the output level of a digital frequency signal can be maintained constant. Therefore, stable output can be obtained from the amplifying unit even when the DC brushless motor is rotating at low speed.

Figure 8:
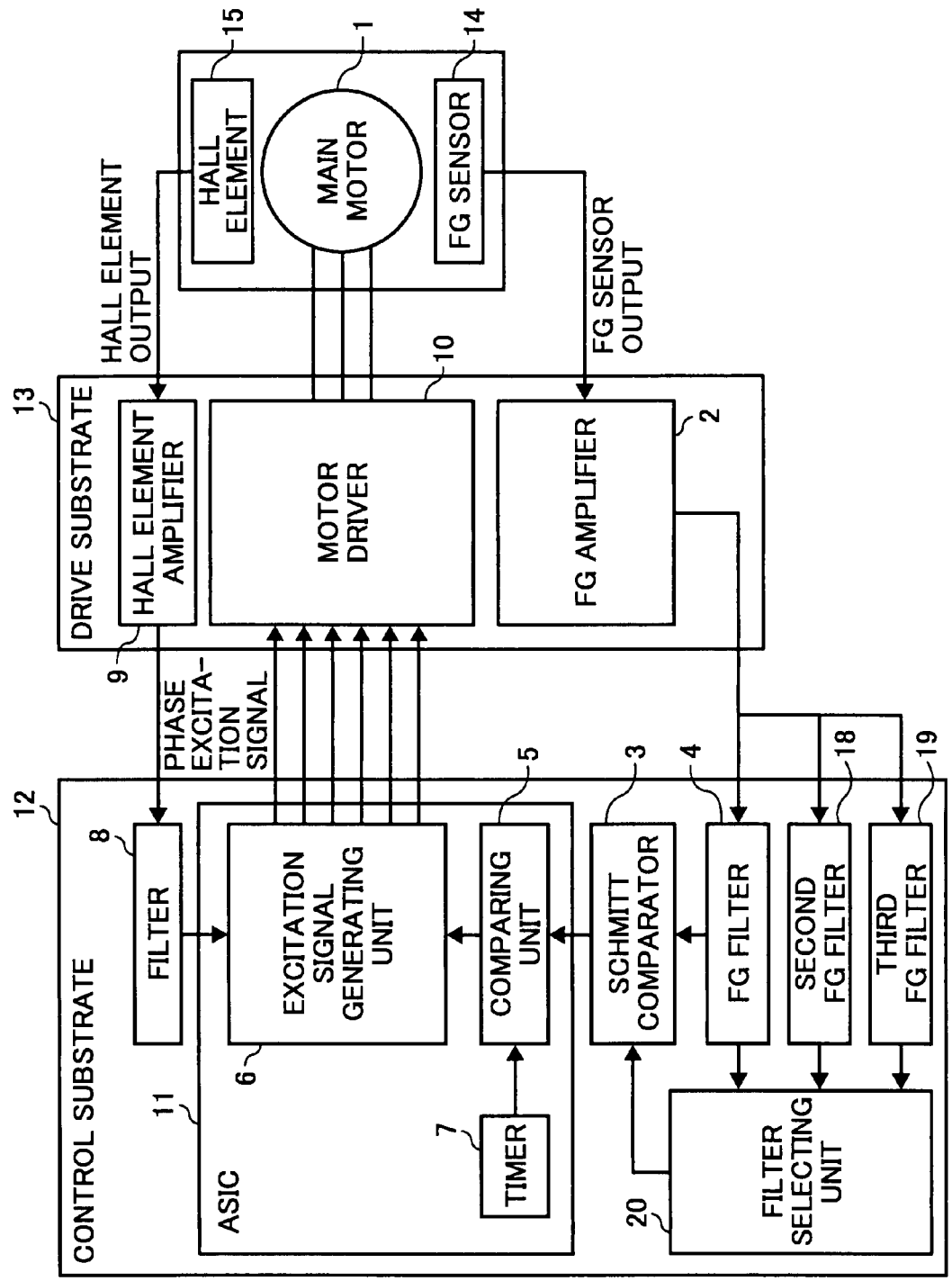
FIG. 8 is a block diagram of a motor driving device according to a third embodiment of the present invention.

FIG. 8 is a block diagram of a motor driving device according to a third embodiment of the present invention. The motor driving device shown in FIG. 8 is basically similar to the motor driving device (FIG. 1) explained in the first embodiment except that it selectively uses a plurality of filters with different cut-off noise frequencies. The same reference characters are utilized in designating corresponding components, and the same explanations are not repeated.

The motor driving device of the third embodiment includes, in addition to the FG filter 4, a second FG filter 18, and a third FG filter 19. The FG filter 4, the second FG filter 18, and the third FG filter 19 have different cut-off frequencies, and selectively pass an FG signal fed back from the drive substrate 13. The motor driving device further includes a filter selecting unit 20 that selects one of the FG filters 4, 18, and 19 for use. The filter selecting unit 20 is arranged on the control substrate 12. The FG filters 4, 18, 19 and the filter selecting unit 20 constitute a cut-off frequency varying unit.

In the third embodiment, a low pass filter is cited as the FG filter 4, the second FG filter 18, and the third FG filter 19 by way of example; however, other filters than the low pass filter, such as a band pass filter, and a digital filter including an FIR filter and an IIR filter, can be used.

As previously explained with reference to FIG. 4A, the FG sensor 14 is characterized in that the amplitude and the frequency of its output are small when the main motor 1 is rotating at low speed, and both the amplitude and frequency increase as the speed of the main motor 1 increases. Because of the output characteristic of the FG sensor 14, if a single FG filter that receives an FG signal from the FG sensor 14 is used, the FG signal noise removal effect tends to decrease as the speed increases and frequency of an FG signal increases.

In the third embodiment, the motor driving device includes a plurality of FG filters, the FG filter 4, the second FG filter 18, and the third FG filter 19, with different cut-off frequencies, and one FG filter is selected by the filter selecting unit 20. Specifically, the filter selecting unit 20 selects an FG filter with a low cut-off frequency when the main motor 1 is rotating at low speed, and selects an FG filter with a higher cut-off frequency as the speed of the main motor 1 increases, so that an accurate FG signal is obtained irrespective of the speed of the main motor 1 without lowering the noise removal effect.

In this manner, one noise removing unit (FG filter) is selected according to the rotation speed of the DC brushless motor (main motor 1) from the noise removing units with different cut-off frequencies. Specifically, a noise removing unit with a low cut-off frequency is selected when the DC brushless motor is rotating at low speed, and a noise removing unit with a higher cut-off frequency is selected as the rotation speed of the DC brushless motor increases. Thus, the noise removal effect does not decrease even if the rotation speed of the DC brushless motor increases. Therefore, an analog frequency signal from which noise is removed is reliably obtained even when the DC brushless motor is rotating at high speed.

How the filter selecting unit 20 selects one of the FG filters 4, 18, and 19 each having a different cut-off frequency is explained.

As described above, the FG sensor 14 is characterized in that the amplitude and the frequency of its output depend on the speed of the main motor 1. Accordingly, if the amplitude or the frequency of the FG sensor output is detected, one of the FG filters 4, 18, and 19 can be selected based on the detection result to maintain the noise removal effect even if the motor speed increases.

Besides, provided that a relationship between rotation speed and elapsed time from activation of the main motor 1 complies with a predetermined operation characteristic, appropriate switch timing can be estimated by the elapsed time from the activation of the main motor 1. Accordingly, an FG filter to be used for maintaining the noise removal effect that fluctuates in response to the motor speed can be selected from the FG filters 4, 18, and 19 by detecting the elapsed time.

In the third embodiment, selection of an FG filter based on FG output amplitude, FG output frequency, and the elapsed time is explained.

First, selection of an FG filter based on FG output amplitude is explained, in which the amplitude of FG sensor output is detected and an FG filter is selected based on the detection result. The filter selecting unit 20 has a function of detecting the amplitude of an FG signal output from the FG sensor 14 by, and, by comparing the amplitude with a reference value, determining appropriateness of an FG filter currently being used.

The filter selecting unit 20 includes, as with the Schmitt comparator 3 that processes the output of the FG filter 4, a circuit (not shown) that realizes the above function by processing the amplitude of FG-filter output-signal with a predetermined reference value as a threshold and determining the appropriateness.

In the following example, the speed is gradually increased from low speed after the main motor 1 is activated, and the operation of selecting an FG filter is repeated until the photosensitive drum stably rotates with a constant peripheral speed. The low pass FG filter 4 with the lowest cut-off frequency is selected first because the amplitude of FG signal output is small at the time of start-up, and the second FG filter 18 and the third FG filter 19 with higher cut-off frequencies are selected as the speed gradually increases. With this, an FG filter can be selected that achieves stable FG signal output even when the main motor 1 is rotating at high speed without lowering the noise removal effect.

Figure 9:
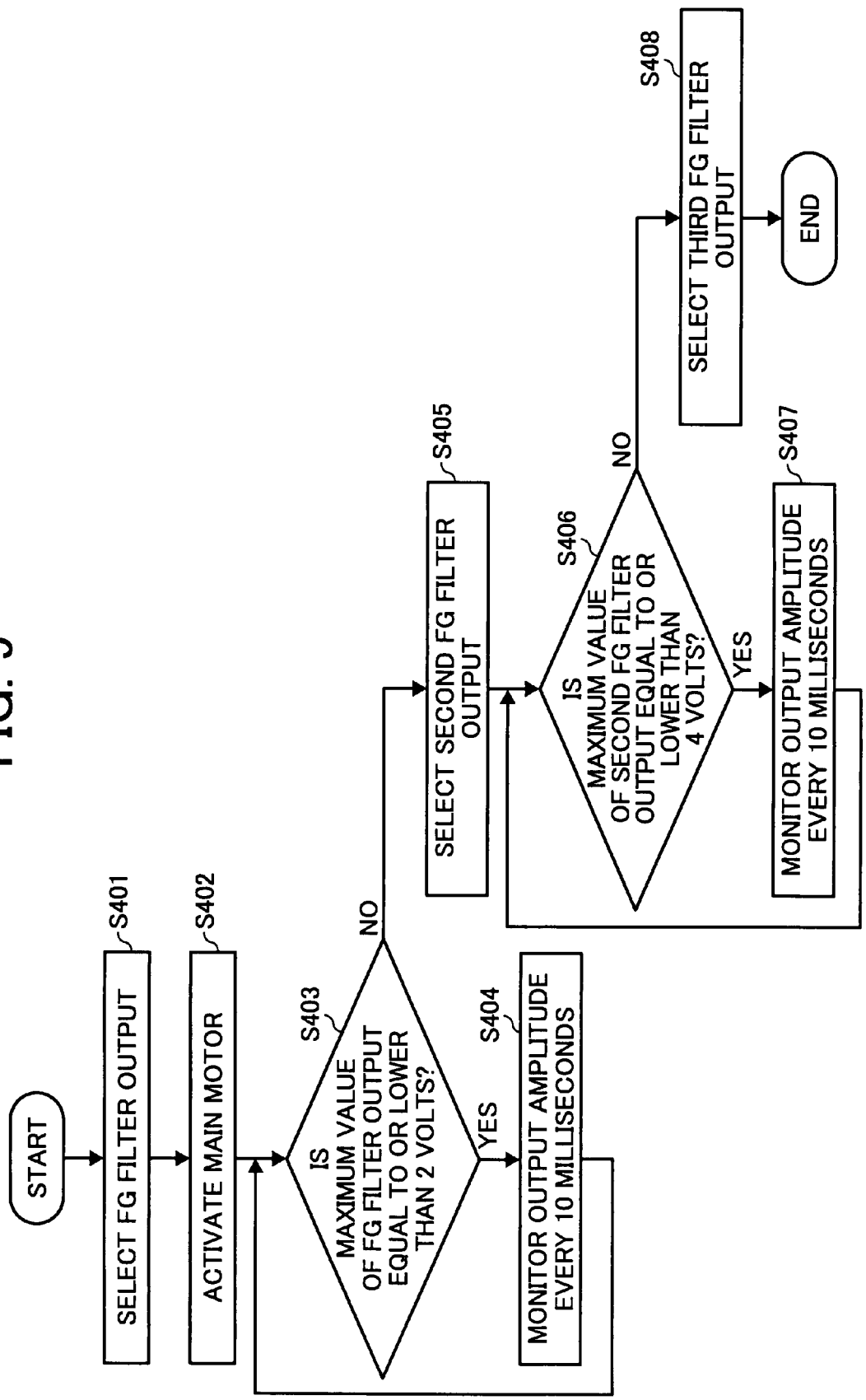
FIG. 9 is a flowchart of a process of selecting an FG filter based on FG output amplitude.

FIG. 9 is a flowchart of a process of selecting an FG filter based on FG output amplitude performed by the filter selecting unit 20.

As shown in FIG. 9, the low pass FG filter 4 with the lowest cut-off frequency is selected according to the setting of the initial condition before activation of the main motor 1 to receive the output of the FG amplifier 2 (step S401).

Thereafter, the main motor 1 is activated (step S402), and the amplitude of the output of the FG filter 4 is periodically monitored (steps S403 and S404). In FIG. 9, the wait time is set to 10 milliseconds, and thus, the amplitude of the FG filter output is monitored every 10 milliseconds. The monitoring interval, however, is not limited to 10 milliseconds, and can be arbitrarily set.

The amplitude of the output detected by monitoring is compared with a predetermined reference value to determine the appropriateness of the FG filter 4 currently being selected. In the example shown in FIG. 9, the reference value is set to 2 volts, and the monitoring is continued without changing the FG filter 4 while the FG filter output does not exceed the reference value (YES at step S403).

If the FG filter output exceeds the reference value (NO at step S403), the use of the FG filter 4 is determined to be inappropriate. Accordingly, the second FG filter 18, i.e., a low pass filter with a higher cut-off frequency, is selected, and the FG filters are switched from one to another (step S405).

After switching to the second FG filter 18, the output amplitude of the second FG filter 18 is continuously monitored (steps S406 and S407). Because the FG filter 4 has been switched to the second FG filter 18, another predetermined reference value is used to determine the appropriateness of the second FG filter 18. In this example, the reference value is changed to 4 volts. Since the setting for the FG filter 4 is 2 volts, the second FG filter 18 is used in the condition of 2 volts to 4 volts.

The output amplitude of the second FG filter 18 is monitored, and the monitoring is continued without changing the FG filter while the FG filter output does not exceed the reference value (4 volts) (YES at step S406).

If the FG filter output exceeds the reference value (NO at step S406), the use of the second FG filter 18 is determined to be inappropriate. Accordingly, the third FG filter 19, i.e., a low pass filter with a higher cut-off frequency, is selected, and the FG filters are switched from one to another (step S408).

By switching the FG filters through the selecting operation as above, stable FG signal output can be obtained and output to the Schmitt comparator 3 without lowering the noise removal effect even when the DC brushless motor is rotating at high speed.

As just described, a noise removing unit (FG filter) with the lowest cut-off frequency is selected upon motor activation when the amplitude of an analog frequency signal is small. A noise removing unit with a higher cut-off frequency is selected as the speed gradually increases to change the cut-off frequency according to the amplitude of the analog frequency signal that depends on the rotation speed of the DC brushless motor (main motor 1). Thus, an analog frequency signal from which noise is removed can be reliably obtained even when the DC brushless motor is rotating at high speed Selection of an FG amplifier based on FG output frequency detection method is explained, in which the frequency of FG sensor output is detected and an FG filter is selected based on the detection result. The filter selecting unit 20 has a function of detecting the frequency of an FG signal output from the FG sensor 14, and, by comparing the frequency with a reference value, determining appropriateness of an FG filter currently being used.

The filter selecting unit 20 includes a circuit (not shown) that realizes the above function by processing the frequency of a signal output from the FG filter 4 with a predetermined reference value as a threshold and determining the appropriateness.

In the following example, the speed is gradually increased from low speed after the main motor 1 is activated, and the operation of selecting an FG filter is repeated until the photosensitive drum stably rotates with a constant peripheral speed. The FG filter 4 with the lowest cut-off frequency is selected first because the frequency of FG signal output is low and the amplitude is small at the time of start-up (see description of FIG. 4A), and the second FG filter 18 and the third FG filter 19 with higher cut-off frequencies are selected as the speed gradually increases, and the frequency increases, i.e., the amplitude increases. With this, an FG filter can be selected that achieves stable FG signal output even when the main motor 1 is rotating at high speed without lowering the noise removal effect.

Figure 10:
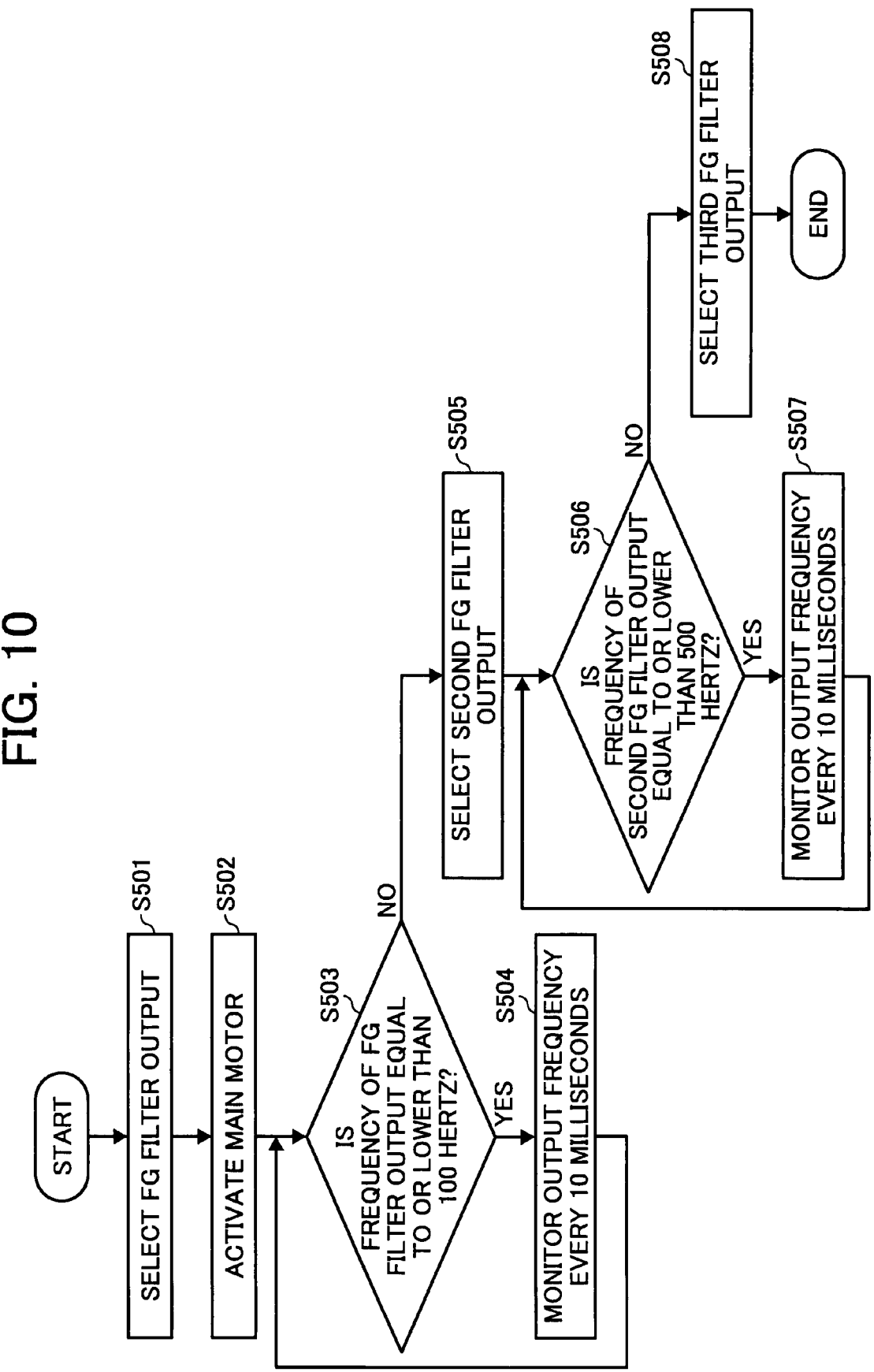
FIG. 10 is a flowchart of a process of selecting an FG filter based on FG output frequency.

FIG. 10 is a flowchart of a process of selecting an FG filter based on FG output frequency performed by the filter selecting unit 20.

As shown in FIG. 10, the low pass FG filter 4 with the lowest cut-off frequency is selected according to the setting of the initial condition before activation of the main motor 1 to receive the output of the FG amplifier 2 (step S501).

Thereafter, the main motor 1 is activated (step S502), and the frequency of the output of the FG filter 4 is periodically monitored (steps S503 and S504). In FIG. 10, the wait time is set to 10 milliseconds, and thus, the frequency of the FG filter output is monitored every 10 milliseconds. The monitoring interval, however, is not limited to 10 milliseconds, and can be arbitrarily set.

The frequency of the output detected by monitoring is compared with a predetermined reference value to determine the appropriateness of the FG filter 4 currently being selected. In the example shown in FIG. 10, the reference value is set to 100 hertz, and the monitoring is continued without changing the FG filter while the FG filter output does not exceed the reference value (YES at step S503).

If the FG filter output exceeds the reference value (NO at step S503), the use of the FG filter 4 is determined to be inappropriate. Accordingly, the second FG filter 18, i.e., a low pass filter with a higher cut-off frequency, is selected, and the FG filters are switched from one to another (step S505).

After switching to the second FG filter 18, the output frequency of the second FG filter 18 is continuously monitored (steps S506 and S507). Because the FG filter 4 has been switched to the second FG filter 18, another predetermined reference value is used to determine the appropriateness of the second FG filter 18. In this example, the reference value is changed to 500 hertz. Since the setting for the FG filter 4 is 100 hertz, the second FG filter 18 is used in the condition of 100 hertz to 500 hertz.

The output frequency of the second FG filter 18 is monitored, and the monitoring is continued without changing the FG filter while the FG filter output does not exceed the reference value (500 hertz) (YES at step S506).

If the FG filter output exceeds the reference value (NO at step S506), the use of the second FG filter 18 is determined to be inappropriate. Accordingly, the third FG filter 19, i.e., a low pass filter with a higher cut-off frequency, is selected, and the FG filters are switched from one to another (step S508).

By switching the FG filter through the selecting operation as above, stable FG signal output can be obtained and output to the Schmitt comparator 3 without lowering the noise removal effect even when the DC brushless motor is rotating at high speed.

As just described, a noise removing unit (FG filter) with the lowest cut-off frequency is selected upon motor activation when the frequency and the amplitude of an analog frequency signal are small. A noise removing unit with a higher cut-off frequency is selected as the speed gradually increases and the frequency increases, i.e., the amplitude increases, to change the cut-off frequency according to the frequency of the analog frequency signal that depends on the rotation speed of the DC brushless motor (main motor 1). Thus, an analog frequency signal from which noise is removed can be reliably obtained even when the DC brushless motor is rotating at high speed Selection of an FG filter based on the elapsed time from motor activation is explained, in which the elapsed time from the motor activation is detected and an FG filter is selected based on the detection result. The filter selecting unit 20 has a function of measuring the time elapsed from motor activation with the timer 7, and, by comparing the measured elapsed time with a reference value, determining appropriateness of an FG filter currently being and used.

The filter selecting unit 20 includes a circuit (not shown) that realizes the above function by initializing the timer 7 simultaneously with activation of the main motor 1, obtaining the elapsed time from the time of activation, and determining whether the obtained elapsed time reaches a predetermined reference time.

In the following example, the speed is gradually increased from low speed after the main motor 1 is activated, and the operation of selecting an FG filter is repeated until the photosensitive drum stably rotates with a constant peripheral speed. The FG filter 4 with the lowest cut-off frequency is selected first because the frequency of FG signal output is low and the amplitude is small at the time of start-up (see description of FIG. 4A), and the second FG filter 18 and the third FG filter 19 with higher cut-off frequencies are selected as the speed gradually increases and the frequency increases, i.e., the amplitude increases. With this, an FG filter can be selected that achieves stable FG signal output even when the main motor 1 is rotating at high speed without lowering the noise removal effect.

Figure 11:
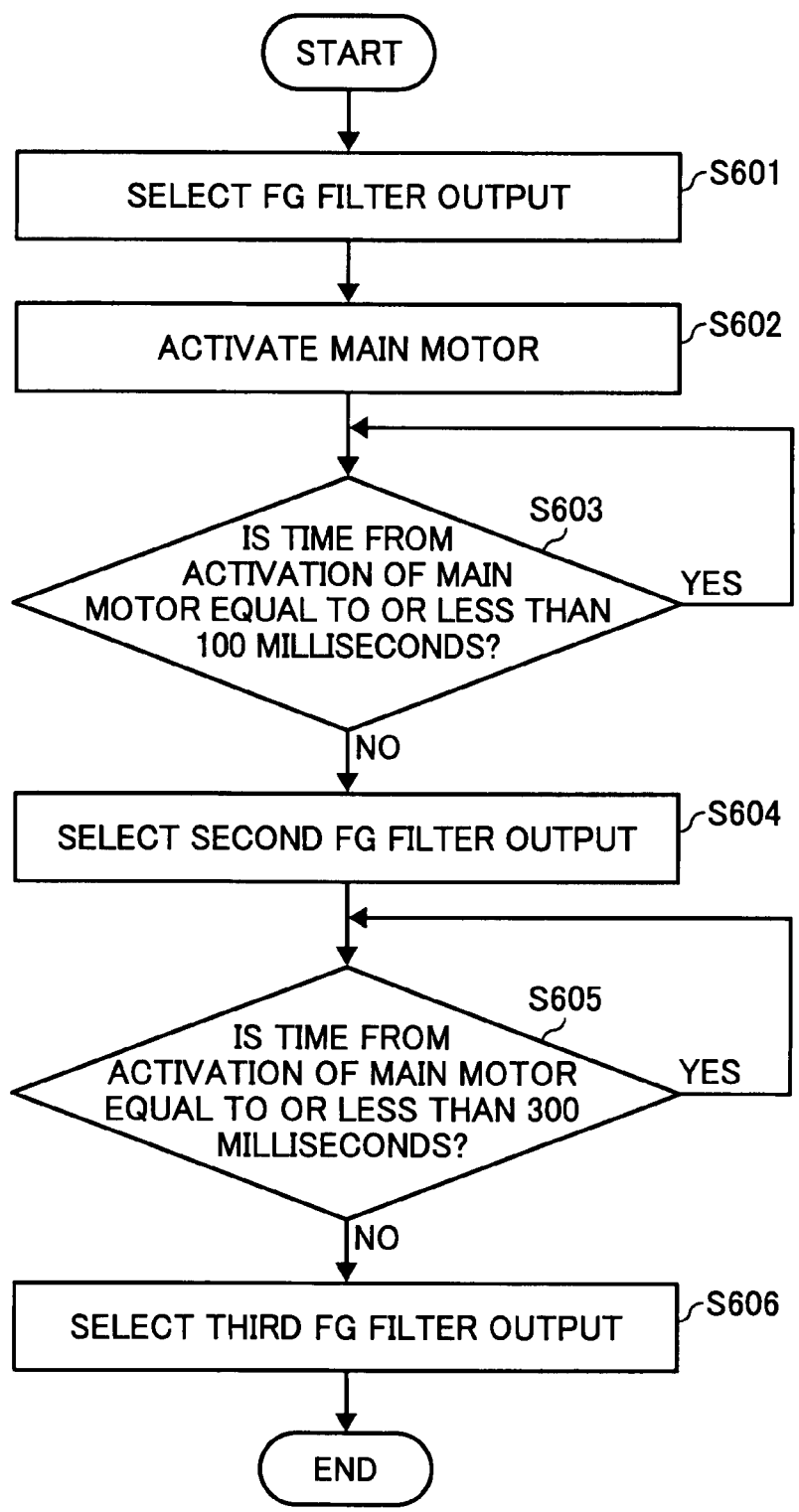
FIG. 11 is a flowchart of a process of selecting an FG filter based on the elapsed time from motor activation.

FIG. 11 is a flowchart of a process of selecting an FG filter based on the elapsed time from motor activation performed by the filter selecting unit 20.

As shown in FIG. 11, the FG filter 4 with the lowest cut-off frequency is selected according to the setting of the initial condition before activation of the main motor 1 to receive the output of the FG amplifier 2 (step S601).

Thereafter, the main motor 1 is activated (step S602). At this point, the timer 7 is initialized to measure the elapsed time from the activation of the main motor 1, and it is periodically checked whether the elapsed time measured by the timer 7 has reached a preset reference time (step S603).

In FIG. 11, the reference time set for determining the appropriateness of the FG filter 4 is 100 milliseconds, and it is checked whether the elapsed time has reached 100 milliseconds. The reference time is not limited to 100 milliseconds, and can be arbitrarily set in view of the "elapsed time-rotation speed" operation characteristic and the filter characteristic of the FG filter.

The operation of checking the elapsed time from the motor activation with the reference time is continued without changing the FG filter while the elapsed time does not exceed 100 milliseconds set as the reference time (YES at step S603).

If the elapsed time exceeds the reference time (NO at step S603), the use of the FG filter 4 is determined to be inappropriate. Accordingly, the second FG filter 18, i.e., a low pass filter with a higher cut-off frequency, is selected, and the FG filters are switched from one to another (step S604).

After switching to the second FG filter 18, the elapsed time from the motor activation is checked with another reference time (step S605) set for determining the appropriateness of the newly selected second FG filter 18. In this example, the reference time is set to 300 milliseconds.

While the elapsed time does not exceed the newly set reference time (300 milliseconds), the check is continued without changing the FG filter (YES at step S605).

If the elapsed time exceeds the reference time (NO at step S605), the use of the second FG filter 18 is determined to be inappropriate. Accordingly, the third FG filter 19, i.e., a low pass filter with a higher cut-off frequency, is selected, and the FG filters are switched from one to another (step S606).

By switching the FG filters through the selecting operation as above, stable FG signal output can be obtained and output to the Schmitt comparator 3 without lowering the noise removal effect even when the DC brushless motor is rotating at high speed.

As just described, a noise removing unit (FG filter) with the lowest cut-off frequency is selected upon motor activation when the frequency and the amplitude of an analog frequency signal are small. A noise removing unit with a higher cut-off frequency is selected as the speed gradually increases and the frequency increases, i.e., the amplitude increases, to change the cut-off frequency according to the elapsed time from the activation of the DC brushless motor (main motor 1) that corresponds to the rotation speed of the DC brushless motor. Thus, an analog frequency signal from which noise is removed can be reliably obtained even when the DC brushless motor is rotating at high speed.

According to the third embodiment, a plurality of noise removing units (FG filters) with different cut-off frequencies are selectively used according to the rotation speed of the DC brushless motor. Thus, the noise removal effect for an amplified analog frequency signal can be maintained constant even when the rotation speed of the DC brushless motor increases. Therefore, an analog frequency signal from which noise is removed can be reliably obtained even when the DC brushless motor is rotating at high speed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor driving device comprising:
an amplifying unit that is mounted on a first substrate and is configured to amplify an analog frequency signal corresponding to a rotation speed of a direct-current brushless motor;
a noise removing unit that is mounted on a second substrate and configured to remove external noise on a transmission path from the first substrate to the second substrate from the amplified analog frequency signal;
an analog-to-digital converter configured to convert the amplified analog frequency signal from which noise is removed to a digital frequency signal;
a calculating unit configured to calculate a current control amount with respect to each phase of the direct-current brushless motor based on the digital frequency signal; and
a motor driving unit configured to drive the direct-current brushless motor at a specified speed based on the current control amount.

2. The motor driving device according to claim 1, further comprising:
a gain varying unit configured to vary a gain of the amplifying unit according to the rotation speed of the direct-current brushless motor such that an output level of the amplified analog frequency signal approaches a same level and a difference in influence of the external noise caused by a difference in the rotation speed of the direct-current brushless motor is reduced.

3. The motor driving device according to claim 2, wherein
the amplifying unit includes a plurality of amplifying units with different gains, and
the gain varying unit selects one of the amplifying units according to the rotation speed of the direct-current brushless motor.

4. The motor driving device according to claim 2, wherein the gain varying unit varies the gain based on amplitude of the analog frequency signal that depends on the rotation speed of the direct-current brushless motor.

5. The motor driving device according to claim 2, wherein the gain varying unit varies the gain based on a frequency of the analog frequency signal that depends on the rotation speed of the direct-current brushless motor.

6. The motor driving device according to claim 2, wherein the gain varying unit varies the gain based on elapsed time from activation of the direct-current brushless motor that corresponds to the rotation speed of the direct-current brushless motor.

7. The motor driving device according to claim 1, further comprising:

a cut-off frequency varying unit configured to vary a cut-off frequency of the noise removing unit according to the rotation speed of the direct-current brushless motor so as not to decrease an effect for removing the external noise from the amplified analog frequency signal.

8. The motor driving device according to claim 7, wherein
the noise removing unit includes a plurality of noise removing units with different cut-off frequencies, and
the cut-off frequency varying unit selects one of the noise removing units according to the rotation speed of the direct-current brushless motor.

9. The motor driving device according to claim 7, wherein the cut-off frequency varying unit varies the cut-off frequency based on amplitude of the analog frequency signal that depends on the rotation speed of the direct-current brushless motor.

10. The motor driving device according to claim 7, wherein the cut-off frequency varying unit varies the cut-off frequency based on a frequency of the analog frequency signal that depends on the rotation speed of the direct-current brushless motor.

11. The motor driving device according to claim 7, wherein the cut-off frequency varying unit varies the cut-off frequency based on elapsed time from activation of the direct-current brushless motor that corresponds to the rotation speed of the direct-current brushless motor.

12. The motor driving device according to claim 1, wherein
the calculating unit and the noise removing unit are mounted on the second substrate, and
the motor driving unit and the amplifying unit are mounted on the first substrate.

13. An image forming apparatus comprising:
an image carrier;
an image forming unit that forms an image on the image carrier;
a direct-current brushless motor that drives the image carrier and the image forming unit; and
the motor driving device of claim 1.

14. The image forming apparatus according to claim 13, wherein the motor driving device further includes a gain varying unit configured to vary a gain of the amplifying unit according to the rotation speed of the direct-current brushless motor such that an output level of the amplified analog frequency signal approaches a same level and a difference in influence of the external noise caused by a difference in the rotation speed of the direct-current brushless motor is reduced.

15. The image forming apparatus according to claim 13, wherein the motor driving device further includes a cut-off frequency varying unit configured to vary a cut-off frequency of the noise removing unit according to the rotation speed of the direct-current brushless motor so as not to decrease an effect for removing the external noise from the amplified analog frequency signal.

16. The image forming apparatus according to claim 13, wherein the calculating unit and the noise removing unit are mounted on the second substrate, and the motor driving unit and the amplifying unit are mounted on a the first substrate.

17. The image forming apparatus according to claim 1, wherein the noise removing unit removes the external noise of high frequency.

18. A motor driving method comprising:
amplifying, on a first substrate, an analog frequency signal corresponding to a rotation speed of a direct-current brushless motor;

removing, on a second substrate, external noise on a transmission path from the first substrate to the second substrate from the analog frequency signal after amplification;

converting the analog frequency signal from which noise is removed to a digital frequency signal;

calculating a current control amount with respect to each phase of the direct-current brushless motor based on the digital frequency signal; and driving the direct-current brushless motor at a specified speed based on the current control amount.

* * * * *